United States Patent [19]
Sevostiyanov et al.

[11] 4,128,314
[45] Dec. 5, 1978

[54] LIQUID-CRYSTAL INDICATOR

[76] Inventors: Vladimir P. Sevostiyanov, ulitsa B. Khmelnitskogo, 20/24, kv. 25; Valery V. Astakhov, ulitsa Borisova-Musatova, 8-a, kv. 5; Vasily P. Usachev, ulitsa Ordzhonikidze, 11-a, kv. 5, all of Saratov, U.S.S.R.

[21] Appl. No.: 805,309

[22] Filed: Jun. 10, 1977

[51] Int. Cl.$^2$ ............................................. G02F 1/13
[52] U.S. Cl. ..................................... 350/341; 252/299
[58] Field of Search ..................... 350/341; 252/299; 428/1

[56] References Cited
U.S. PATENT DOCUMENTS 3,938,342  2/1976  Sussman ........................... 350/341 X
4,043,647  8/1977  Oues et al. ........................ 350/341 X Primary Examiner—Edward S. Bauer
Attorney, Agent, or Firm—Steinberg & Blake

[57] ABSTRACT

The present invention relates to a liquid-crystal indicator, wherein a layer of nematic liquid crystals is interposed between two transparent multi-layered blocks. Each of the multi-layered blocks comprises successively disposed, in a direction from the layer of the liquid crystals, a layer of germanium oxide ensuring a twisted structure of the liquid crystals, a current-conducting layer, a dielectric layer and a polarizing layer. The use of germanium oxide makes it possible to lower the control voltage of the indicator to values of below 1.8 V.

3 Claims, 2 Drawing Figures

LIQUID-CRYSTAL INDICATOR

The present invention relates to the art of displaying visual information for individual or collective use, and more specifically to liquid crystals and is useful for the manufacture of various devices for display of visual information.

Known in the art are liquid-crystal indicators embodied in the form of two transparent parallel-disposed dielectric plates provided with current-conducting coatings applied onto the inner surface thereof and adapted to serve as electrodes. Between the electrodes a layer of a liquid crystal is located oriented in such a manner that in its volume the major axes of the crystal molecules are parallel to the electrode surface; therewith, the molecules adjacent to one plate form an angle of 90° relative to the major axes of the molecules adjacent to the second plate. In this manner, a "twisted" structure of the liquid crystal are placed between polaroids.

A mandatory condition for operation of such an indicator based on the "twist"-effect is the use of liquid-crystalline compounds with a positive value of dielectric anisotropy.

Known in the art is the use of liquid-crystalline materials based on axo-oxybenzenes.

A principal disadvantage of the prior art liquid-crystalline materials resides in that the indicators based thereon require high (above 2.5-3 V) control voltages.

Different methods are employed for the formation of an oriented layer of a liquid crystal.

It is known to use mechanical rubbing of fluoroplastic onto surface of the electrodes. In doing so, molecules of the liquid crystal fill the grooves in the rubbed-on layer. This mode of orientation has a disadvantage residing in instability of the orienting layer under the influence of heat both in the course of manufacture of the indicator and during its operation and storage.

Also known is a method of producing orienting layers by applying, onto the electrode's surface, thin transparent heat-resistant dielectric layers of gold, platinum, aluminium and silicon monoxide.

The method of application of the orienting layers consists in thermal vacuum evaporation of the above-mentioned materials under a residual pressure of $10^{-5}$ mm Hg; therewith, the electrodes are placed at the angle of 85° relative to the evaporator target. This method enables application, onto the electrode surface, of layers with a thickness of up to 100Å having a crest-like character. Molecules of the liquid crystal are spontaneously oriented so that their major axes are positioned parallel to the resulting crests.

All the above-mentioned compounds, except silicon monoxide, are coloured, whereby optical parameters of such indicators become substantially impaired.

Known is a liquid-crystal indicator, wherein the oriented layer is made of silicon monoxide.

For a stable orientation of the liquid crystal it is necessary to apply orienting layers with a strictly predetermined thickness. Therewith, two opposite trands originate. At a greater thickness of the layers a stable orientation of a liquid crystal may be achieved, though control voltages of the indicator are increased due to dielectric properties of the applied orienting layer. With thin layers, on the contrary, excitation voltage might be rather low, but stable orientation would not be achieved in this case.

In the present invention, the use of silicon monoxide as the orienting layer at an optimal layer thickness requires, due to high dielectric properties of silicon monoxide, control excitation voltages above 2.5-3 V. High voltages shorten the service life of the indicator and of the autonomous power source needed for operatition thereof.

It is an object of the present invention to provide a liquid-crystal indicator with an excitation voltage of below 1.8 V.

It is another object of the present invention to extend the service life of the indicator and autonomous power sources.

Still another object of the present invention is to stabilize electrical and optical parameters of the indicator during its service and storage.

These and other objects are accomplished by the provision of a liquid-crystal indicator composed of a layer of nematic liquid crystals located between two transparent multi-layered blocks, each of them containing successively disposed, in the direction from said layer of nematic liquid crystals, a layer of a substance ensuring orientation of molecules of nematic liquid crystals in such a manner that major axes of the molecules adjacent to one multi-layered block are parallel thereto and to each other and form the angle of 90° relative to major axes of the molecules of nematic liquid crystals adjacent to the second multi-layered block; a current-conducting layer, a dielectric layer and a polarizing layer; in accordance with the present invention, the layer of the substance ensuring said orientation of molecules of nematic liquid crystals is made of germanium oxide.

To lower interaction energy at the liquid crystal-germanium oxide interface it is advisable that the layer of nematic liquid crystals be added with organic compounds in an amount of up 7.5% by weight; said organic additives comprising cyclic compounds conjugated with donor and acceptor groups and having dipole moments exceeding by at least 1.4 times dipole moments of the nematic liquid crystals.

As the organic additive use should be preferably made of 4-aminobenzonitrile.

The present invention will now become more fully apparent from the following detailed description and examples illustrating its embodiments with reference to the accompanying drawings, wherein.

Figure 1:
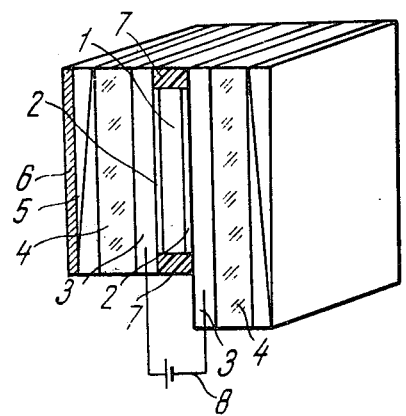
FIG. 1 is a liquid-crystal indicator according to the present invention, elevation view.

The liquid-crystal indicator according to the present invention comprises a layer 1 (FIG. 1) of nematic liquid crystals corresponding to the formulae:

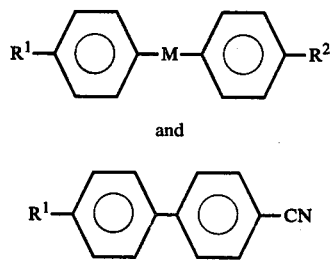

wherein $R^1$ and $R^2$ are each an alkyl, alkoxy, nitrile and nitro radicals; M is azo, azo-oxy, ester, azo-methyne and benzene groups.

Said liquid crystals can contain donor-acceptor organic additives in the amount of up to 7.5% by weight; the additives having the following formula D — X — A, wherein:

D — $N(C_3H_7)_2$, $N(C_2H_5)_2$, $NH_2$, $OCH_2 C_6H_5$, OH, NHOH, alkyl, alkoxy, acyloxy radicals, $C(CH_3)_3$, $C_6H_5$, $CH_2OH$; A—$N_2^+$, $NO_2$, CN, $N=N(C_6H_5)$, SCN, $COCH_3$, $COC_6H_5$, $CCl_3$, CHO, COOH, $CH_2CN$, NO, F Br, J;

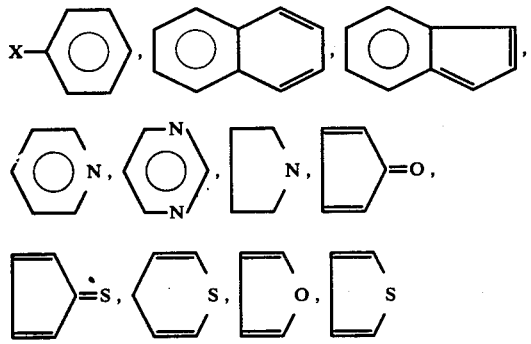

Incorporation of said additives in an amount of up to does not affect, as a rule, the eutectic composition of nematic liquid crystals.

Therewith, best results are ensured by the addition of 4-aminobenzonitirle.

At both sides of the layer 1 two transparent multi-layered blocks are positioned, each of them containing successively disposed, in a direction from the layer of said nematic liquid crystals, an orienting layer 2 of germanium oxide, a current-conducting layer 3 made, for example, of indium oxide or tin oxide; a dielectric layer 4 made, for example, of glass; and a polarizing layer 5.

If the indicator operates in a "reflection" mode a reflecting coating 6, e.g. metallized one, is applied onto the outer face of the polarizing layer 5 at the side opposite to a viewer. The layer 1 of liquid crystals is sealed, by means of a sealing compound 7, over the perimeter of the multi-layered blocks.

The current-conducting layers 3 are connected to a power source 8.

Figure 2:
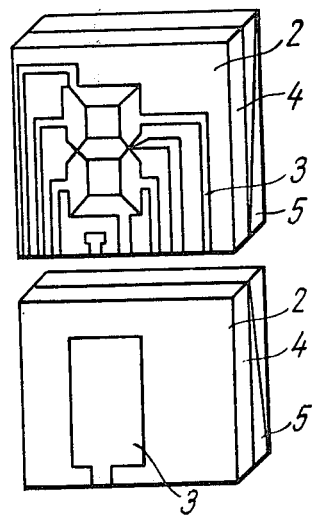
FIG. 2 is a general view of an embodiment of multi-layered blocks according to the present invention.

In one embodiment of the multi-layered blocks according to the present invention for display of visual information said current-conducting layers 3 are deposited (FIG. 2) in the form of a seven-sector pattern.

The above-described liquid-crystal indicator operates in the following manner.

When voltage is applied to the current-conducting layers 3 molecules in the layer 1 of nematic liquid crystals become re-oriented in the electric field, and optical properties of the liquid-crystalline layer are changed.

The excitation voltage value will depend on numerous factors, among which the principal ones are: nature of the orienting layer 2 and composition of the layer 1 of liquid crystals.

In accordance with the present invention, germanium oxide employed for orientation of the liquid crystal has a high adhesion to glass and current-conducting coatings; it is inert to organic materials including liquid crystals, and does not dissociate under the action of electric current. It has been noted that liquid-crystalline compounds, irrespective of their composition, are liable to homogeneous orientation at the surface of germanium oxide, thus improving the optical properties of the indicator. These advantages are caused by a clearly pronounced covalent bond formed in oxygen-containing germanium compounds.

The use of germanium oxide in the indicator structure has revealed that to obtain a stable and reproducible orientation, it is necessary to have thinner layers than in the case of silicon monoxide. This makes possible to reduce control voltages of the indicator.

The additive introduced into the liquid crystal and containing highly polar donor-acceptor groups form strong donor-acceptor bonds with groups and individual atoms of the liquid crystals.

Such interaction results in the formation of donor-acceptor complexes within the volume of the liquid crystal. Owing to the fact that dipole moments of the additives exceed the crystal dipole moment by at least 1.4 times, the resulting donor-acceptor complexes have a higher value of electric anisotropy, first of all, due to increased permittivity in the direction parallel to the major axis of the liquid crystal molecule. As a result, the liquid-crystalline mixture is made, firstly, defective as to the content of complexes abnormal in respect to their physico-chemical properties and, secondly, it becomes more sensitive to variations of the excitation voltage. This is also facilitated by the presence of inorganic covalent layers, as the orienting layer, of germanium oxide having smaller interaction energy at the interface between the liquid crystal and germanium oxide than in the case of the liquid crystal and silicon oxide.

The present invention makes it possible to reduce the excitation voltage of the indicator to a value below 1.8 V, as well as to increase the service life of the indicator and autonomous power sources therefor, and to stabilize the electrical and optical parameters of the indicator during its operation and storage.

EXAMPLE 1

4-Aminobenzonitrile is prepared in two stages: first 4-nitrobenzonitrile is produced which is then reduced to 4-aminobenzonitrile.

To perfomr the synthesis of 4-nitrobenzonitrile, in a 100 ml flask there are dissolved 30 ml of pyrudine, 5 g (0.04 M) of 4-nitrobenzaldehyde and 4 g (0.05 M) of hydroxylamine hydrochloride. The resulting solution is added with 13 ml of acetic anhydride; therewith, temperature is elevated to 80° C. The mass is heated at a temperature of from 80° to 90° C. for 1 hour, whereafter it is cooled and poured onto 500 g of ice. The precipitate is filtered off, washed with water and recrystallized from ethanol. Melting point of 4-nitrobenzonitrile is 147°–148° C.

To a solution of 150 g (0.08 M) of tin dichloride in 127.5 ml of a concentrated hydrochloric acid there are added portion-wise under stirring 30 g (0.2 M) of 4-nitrobenzonitrile, and the mixture is stirred for 2 hours at a temperature within the range of from 20° to 30° C. Then the reaction mass is transfered into a 2 l conic flask and 800 ml of concentrated hydrochloric acid are added thereto. The mixture is allowed to stay overnight in the cold. The resulting hydrochloride is filtered off and placed into 600 ml of a 20% solution of caustic soda. The reaction mixture is cooled and allowed to stay for 2 hours. The formed 4-aminobenzonitrile is filtered off and recrystallized from water with coal (1.0–1.5 g of coal per 100 g of the precipitate). Melting point of 4-aminobenzonitrile is 87° C.

The thus-prepared 4-aminobenzonitrile is introduced into liquid crystals of the formula:

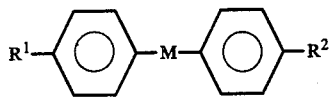

wherein $R^1$ and $R^2$ are each an alkyl, alkoxy, and nitrile radicals; M is azo-oxy, ester, azomethyne and benzene groups.

In the following Table there are given compositions of liquid-crystalline mixtures containing different concentrations of 4-aminobenzonitrile, and excitation voltage values are specified at which the contrast range of the indicator display image is realized of at least 90% relative to the background.

The donor-acceptor additive at 4-aminobenzonitrile has a dipole moment above 6 debye, whereas dipole moments of the liquid-crystalline mixtures shown as an example do not exceed 4.4 debye.

EXAMPLE 2

Into a mixture of nematic liquid crystals consisting of 24.0% by weight of 4-n-amyl-4′-cyanobiphenyl, 24,0% by weight of 4-n-heptyl-4′-cyanobiphenyl, 24.0% by weight of 4-n-hexyloxy-4′-cyanophenyl ester 24.5% by weight of 4-n-heptyl-4′-cyanoterphenyl there are added 3.5% by weight of an organic additive, i.e. 1-nitro-6-N,N′-dipropylazuline.

The control voltage of the indicator based on said liquid crystals is 1.7 to 1.8 V.

EXAMPLE 3

Into a mixture of nematic liquid crystals consisting of 40.5% by weight of 4-n-butyl-4′-methoxyazoxybenzene, 20% by weight of 4-n-butyl-4′-heptanoyloxyazoxybenzene and 37.0% by weight of 4′-cyanophenyl ester of 4-n-heptylbenzoic acid there are added 2.5% by weight of an organic additive. i.e. γ-cyanothiopyrane.

The control voltage of the indicator based on a mixture of said liquid crystals is 1.8 V.

Table

| No. | $R^1$ | $R^2$ | M | Composition of liquid-crystalline mixture, wt.% | Amount of the additive, wt,% | Excitation |
|-----|-------|-------|---|------|------|------|
| 1 | 2 | 3 | 4 | 5 | 6 | 7 |
| 1. | —CH₃O | —C₄H₉ | —CH=N— | 32.0 | 4.0 | 1.7–1.8 |
|    | —C₂H₅O | —C₄H₉ | —CH=N— | 32.0 | | |
|    | —C₄H₉ | —CN | —CH=N— | 32.0 | | |
| 2. | —C₄H₉ | —CH₃O | —NON— | 52.0 | 4.0 | 1.4–1.5 |
|    | —C₄H₉ | —OCO₂H₁₃C₆ | —NON— | 30.0 | | |
|    | —C₆H₁₃ | —CN | —COO— | 14.0 | | |
| 3. | —C₄H₉ | —CH₃O | —NON— | 48.0 | 7.5 | 1.6–1.8 |
|    | —C₄H₉ | —OCO₂H₁₃C₆ | —NON— | 30.0 | | |
|    | —C₆H₁₃ | —CN | —COO— | 14.5 | | |
| 4. | —C₄H₉ | —CH₃O | —NON— | 40.0 | 4.0 | 1.5–1.6 |
|    | —C₄H₉ | —OCO₂H₁₃C₆ | —NON— | 20.0 | | |
|    | —C₇H₁₅ | —CN | —COO— | 36.0 | | |
| 5. | —C₄H₉ | —CN | —COO— | 22.0 | 4.0 | 1.4–1.5 |
|    | —C₆H₁₃ | —CN | —COO— | 28.0 | | |
|    | —C₇H₁₅ | —CN | —COO— | 46.0 | | |
| 6. | —C₄H₉ | —CN | —COO— | 24.0 | 4.0 | 1.3–1.5 |
|    | —C₆H₁₃ | —CN | —COO— | 24.0 | | |
|    | —C₇H₁₅ | —CN | —COO— | 24.0 | | |
|    | —C₇H₁₅ | —CN | —CH=CH COO | 24.0 | | |
| 7. | —C₅H₁₁ | —CN | — | 32.0 | 4.0 | 1.1–1.3 |
|    | —C₇H₁₅ | —CN | — | 32.0 | | |
|    | —C₅H₁₁O | —CN | — | 32.0 | | |
| 8. | —C₅H₁₁ | —CN | — | 24.5 | 1.5 | 1.6–1.8 |
|    | —C₇H₁₅ | —CN | — | 24.5 | | |
|    | —C₆H₁₃O | —CN | — | 24.5 | | |
|    | —C₇H₁₅ | —CN | —C₆H₄— | 2.0 | | |
| 9. | —C₅H₁₁ | —CN | — | 24.0 | 4.0 | 1.3–1.4 |
|    | —C₇H₁₅ | —CN | — | 24.0 | | |
|    | —C₆H₁₃O | —CN | — | 24.0 | | |
|    | —C₇H₁₅ | —CN | —C₆H₄— | 24.0 | | |

What is claimed is:

1. A liquid-crystal indicator comprising a layer of nematic liquid crystals; two transparent multi-layered blocks with said layer of said nematic liquid crystals being located therebetween; each of said multi-layered blocks containing successively disposed in a direction from said layer of said nematic crystals: a layer of germanium oxide ensuring orientation of molecules of said liquid crystals so that major axes of the molecules adjacent to one multilayered block are parallel thereto and to each other and form an angle of 90° with respect to major axes of the molecules adjacent to the second multi-layered block; a current-conducting layer; a dielectric layer; a polarizing layer.

2. A liquid-crystal indicator as claimed in claim 1, wherein said layer of said nematic liquid crystals also contains organic additives in an amount of up to 7.5% by weight, said additives comprising cyclic compounds conjugated with donor and acceptor groups and having dipole moments exceeding by at least 1.4 times dipole moments of the nematic liquid crystals.

3. A liquid-crystal indicator as claimed in claim 2, wherein said organic additive comprises 4-aminobenzonitrile.

* * * * *